(12) United States Patent
Kempshall

(10) Patent No.: US 10,180,083 B1
(45) Date of Patent: Jan. 15, 2019

(54) CONVERTIBLE DUCTED FAN ENGINE

(71) Applicant: Hyalta Aeronautics, Inc., Largo, FL (US)

(72) Inventor: Scott R. Kempshall, St. Petersburg, FL (US)

(73) Assignee: Hyalta Aeronautics, Inc., Largo, FL (US)

( * ) Notice: Subject to any disclaimer, the term of this patent is extended or adjusted under 35 U.S.C. 154(b) by 418 days.

(21) Appl. No.: 15/209,383

(22) Filed: Jul. 13, 2016

(51) Int. Cl.
| | |
|---|---|
| *F04D 29/32* | (2006.01) |
| *F01D 25/24* | (2006.01) |
| *F01D 5/12* | (2006.01) |
| *F01D 5/02* | (2006.01) |
| *F04D 29/52* | (2006.01) |

(52) U.S. Cl.
CPC ............ *F01D 25/24* (2013.01); *F01D 5/02* (2013.01); *F01D 5/12* (2013.01); *F04D 29/325* (2013.01); *F04D 29/526* (2013.01); *F05D 2240/14* (2013.01); *F05D 2240/30* (2013.01); *F05D 2240/50* (2013.01); *F05D 2240/61* (2013.01)

(58) Field of Classification Search
CPC ... F01D 5/02; F01D 5/12; F01D 25/24; F04D 29/323; F04D 29/325; F04D 29/326; F04D 29/526; B64C 11/001
USPC ................ 415/126, 127, 131, 158, 166, 167
See application file for complete search history.

(56) References Cited

U.S. PATENT DOCUMENTS

| | | | | | |
|---|---|---|---|---|---|
| 1,703,081 | A | * | 2/1929 | Moody | F03B 11/004 415/116 |
| 2,083,184 | A | * | 6/1937 | Anderson | F04D 29/464 415/165 |
| 2,542,121 | A | * | 2/1951 | Earl | F04D 25/16 415/157 |
| 2,957,372 | A | * | 10/1960 | Gibson | F16H 61/54 123/41.11 |
| 4,553,404 | A | * | 11/1985 | Malchow | F24F 1/027 415/148 |

* cited by examiner

*Primary Examiner* — Woody Lee, Jr.
*Assistant Examiner* — Su Htay
(74) *Attorney, Agent, or Firm* — Nicholas Pfeifer; Smith & Hopen, P. A.

(57) ABSTRACT

A convertible ducted fan engine having a shroud connected to a shroud shaft, a drive shaft connected to a mechanical fan, a rotational drive motor configured to rotate the drive shaft and mechanical fan, and a linear drive motor configured to translate the drive shaft and mechanical fan in a direction parallel to a longitudinal axis of the shroud. The convertible ducted fan engine includes a fluid-propulsion configuration in which the mechanical fan rotates freely with respect to the shroud to produce thrust through fluid flow, and a drive-wheel configuration in which the mechanical fan is in contact with the shroud, thereby causing concurrent rotation of the shroud and mechanical fan when the mechanical fan rotates about the rotational axis.

17 Claims, 3 Drawing Sheets

CONVERTIBLE DUCTED FAN ENGINE

BACKGROUND OF THE INVENTION

1. Field of the Invention

This invention relates, generally, to a ducted fan engine. More specifically, it relates to a ducted fan engine capable of converting between a typical fluid-propulsion configuration and a friction-based drive-wheel configuration.

2. Brief Description of the Prior Art

The current state of the art includes a plurality of distinct thrust producing engines. Typically, these engines are single purpose drive systems designed around the type of vehicle (e.g. ground vehicles, watercraft, or aircraft) on which they are intended to operate. For example, a drive-wheel—a tire connected to a rotating shaft—provides propulsion for land vehicles, while propellers or turbines are connected to a drive shaft to provide propulsion for aircrafts and watercrafts.

Some hybrid vehicles can operate in multiple mediums, such as, amphibious automobiles, which are capable of operating on land and water. Such vehicles, however, require separate or reconfigurable drive systems. For example, amphibious automobiles have a drive system for land-based travel and a separate propulsion system for aquatic-based travel. Both separate and reconfigurable drive systems are less than ideal. Reconfigurable drive systems can be complex and thus more susceptible to failure, while separate drive systems occupy twice the space and require twice the fuel compared to a single drive system.

Accordingly, what is needed is convertible engine that can operate as a fluid-propulsion engine and also as a friction-based drive-wheel. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a convertible engine that can operate as a fluid-propulsion engine and also as a friction-based drive-wheel is now met by a new, useful, and nonobvious invention.

The novel structure of the convertible ducted fan engine includes a shroud connected to a shroud shaft, a drive shaft connected to a mechanical fan, a rotational drive motor configured to rotate the drive shaft and mechanical fan, and a linear drive motor configured to translate the drive shaft and mechanical fan in a direction parallel to a longitudinal axis of the shroud shaft. The mechanical fan includes a plurality of blades concentrically arranged about a rotational axis.

The convertible ducted fan engine includes a fluid-propulsion configuration in which the mechanical fan rotates freely with respect to the shroud to produce thrust through fluid flow, and a drive-wheel configuration in which at least one of the blades in the plurality of blades is in contact with the shroud, thereby causing concurrent rotation of the shroud and mechanical fan when the mechanical fan rotates about the rotational axis.

In an embodiment, the drive shaft is configured to move the mechanical fan both (1) into contact with the shroud to place the ducted fan engine into the drive-wheel configuration and (2) out of contact with the shroud to place the ducted fan engine into the fluid-propulsion configuration. An embodiment includes the shroud shaft aligned with the rotational axis and the drive shaft configured to telescopically receive the shroud shaft.

In an embodiment, the ducted fan engine includes a blade-contacting flange disposed on an internal surface of the shroud and extending a distance inwardly towards the central longitudinal axis of the shroud. The blade-contacting flanges extends inwardly a distance that is greater than the difference between the outer diameter of the mechanical fan and the inner diameter of the shroud.

An embodiment, includes the blade-contacting flange located proximate to a fore end of shroud, such that the drive-wheel configuration is achieved by translating the mechanical fan towards the fore end of the shroud until at least one of the blades in the plurality of blades comes in contact with the blade-contacting flange. The fluid-propulsion configuration is achieved by translating the mechanical fan towards an aft end of the shroud until none of the blades in the plurality of blades can contact the blade-contacting flange when the mechanical fan rotates about the rotational axis.

An embodiment further includes a tread disposed on an outer surface of the shroud. The tread increases the traction between a shroud-contacting surface and the shroud when the ducted fan engine operates in the drive-wheel configuration.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Drive-Wheel Configuration: is a configuration where the shroud and the mechanical fan are configured to concurrently rotate.

Fluid-Propulsion Configuration: is a configuration where the shroud and the mechanical fan are configured to rotate independently.

Shroud: is a structure intended to surround the mechanical fan at least when the convertible ducted fan engine is in the drive-wheel configuration.

Tread: is a material disposed on the external surface of the shroud that is intended to increase traction between the shroud and the shroud-contacting surface.

The present invention is a convertible ducted fan engine having a drive-wheel configuration and a fluid-propulsion configuration. The convertible ducted fan engine includes a shroud and a mechanical fan. In the drive-wheel configuration, the mechanical fan is in contact with the shroud such that the two concurrently rotate. As a result, the shroud effectively becomes a rotating drive-wheel. In the fluid-propulsion configuration, the mechanical fan is free to rotate with respect to the shroud to produce thrust as is typical with a propeller.

Figure 1A:
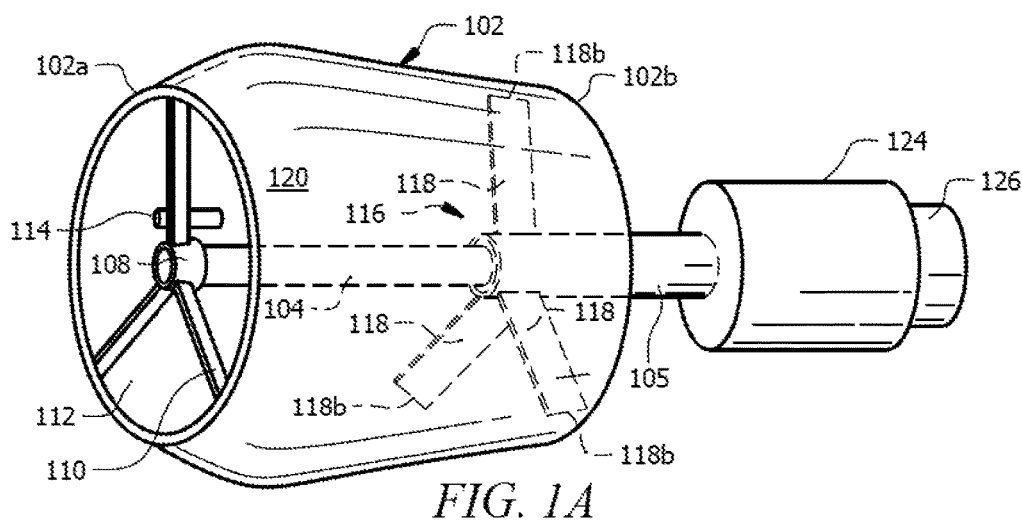
FIG. 1A is a perspective view of an embodiment of the present invention, in which the mechanical fan is retracted towards the aft end of the shroud such that rotation of the mechanical fan does not cause rotation of the shroud.
Figure 1B:
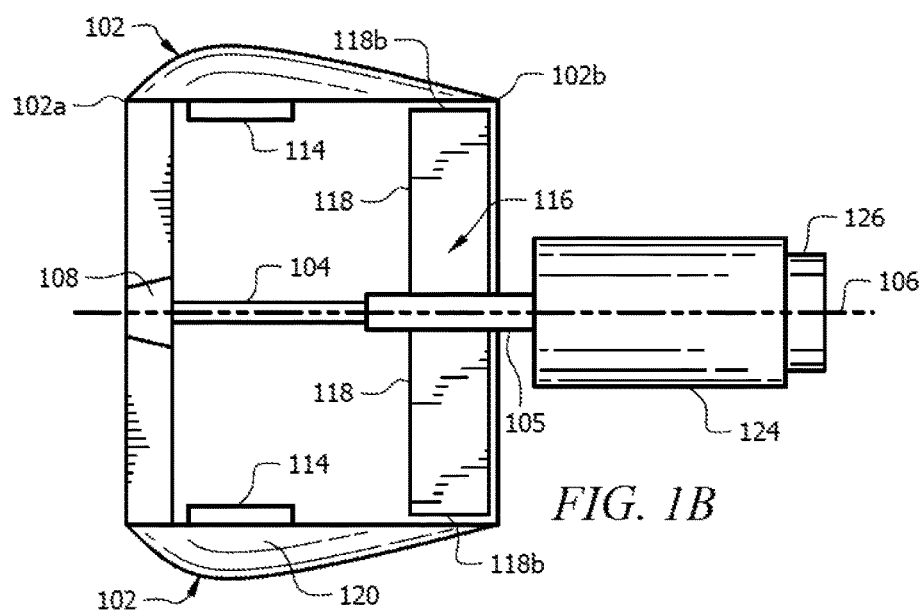
FIG. 1B is a top view of the embodiment shown in FIG. 1A with an upper section of the shroud removed to view the internal area of the shroud.
Figure 2A:
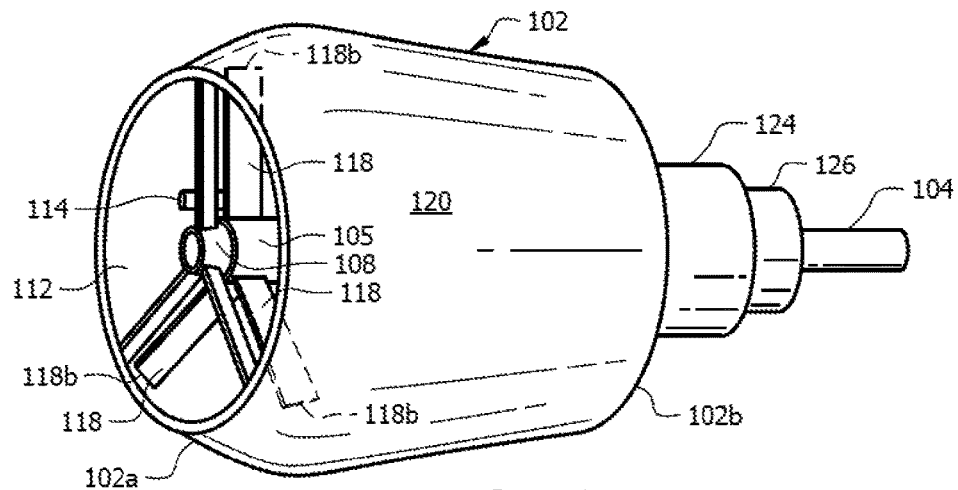
FIG. 2A is a perspective view of an embodiment of the present invention, in which the mechanical fan is located proximate to the fore end of the shroud such that rotation of the mechanical fan causes rotation of the shroud.

Referring now to FIGS. 1-2, an embodiment of the convertible ducted fan engine includes shroud 102 secured to a shroud shaft 104 at fore end 102a of shroud 102. Shroud shaft 104 is centrally aligned with longitudinal axis 106 of shroud 102 through collar 108. Collar 108 is also centrally aligned with longitudinal axis 106 and is fixed in place through supports 110, which extend radially to the internal surface 112 of shroud 102. An embodiment may include a secondary collar and corresponding supports secured to the aft end of the shroud. The secondary collar would be sized to slidingly receive drive shaft 105 at a location aft of the mechanical fan 116 so as not to impair the translation of the mechanical fan 116. As an alternative, the secondary collar slidingly receives the motor housing 124 rather than drive shaft 105. Such an embodiment would require the motor housing to remain at least partially within the shroud in both the drive-wheel and the fluid-propulsion configuration.

Internal surface 112 also includes blade-contacting flange 114 extending inwardly towards longitudinal axis 106. Blade-contacting flange 114 extends inwardly a distance that is greater than the difference between the inner diameter of shroud 102 and the outer diameter of mechanical fan 116. The outer diameter of mechanical fan 116 is established by distal free ends 118b of blades 118. As depicted in the exemplary embodiment, blade-contacting flange 114 is disposed proximate to fore end 102a of shroud 102. Blade-contacting flange 114, however, may be located anywhere along internal surface 112, such that blades 118 can contact blade-contacting flange 114 when mechanical fan 116 is moved into radial alignment with blade-contacting flange 114. In an embodiment, several blade-contacting flanges may be disposed on internal surface 112 to better secure mechanical fan 116 when the engine is in the drive-wheel configuration.

Figure 2B:
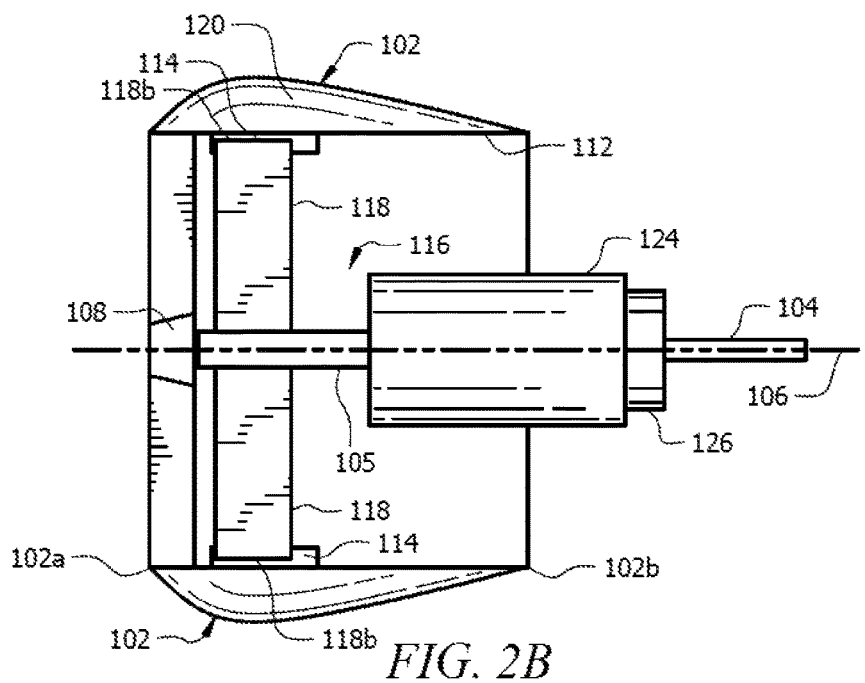
FIG. 2B is a top view of the embodiment shown in FIG. 2A with an upper section of the shroud removed to view the internal area of the shroud.

As mostly clearly depicted shown in FIGS. 1B and 2B, internal surface 112 of the exemplary embodiment is cylindrical in shape. The uniform cylindrical shape allows mechanical fan 116 to freely transition between the fore and aft ends 102a, 102b of shroud 102. Or in other words, mechanical fan 116 can easily move (1) into radial/transversal alignment with blade-contacting flange 114 as shown in FIG. 2B, and (2) out of radial/transversal alignment with blade-contacting flange 114 as shown in FIG. 1B. In an embodiment, the cross-section of internal surface 112 may be non-uniform along longitudinal axis 106 of shroud 102. A non-uniform cross-section may be used instead of one or more blade-contacting surfaces to establish concurrent rotation of the mechanical fan and the shroud. For example, the internal surface may be tapered at a certain location along the longitudinal axis of the shroud giving the tapered section an internal diameter that is equal to or less than the outer diameter of the mechanical fan. Translation of the mechanical fan into the tapered section press-fits the mechanical fan into the tapered section to allow for concurrent rotation of the mechanical fan and the shroud. Alternatively, the tapered section may include a plurality of grooves to receive the blades, which has a similar functionality as the blade-contacting flange.

As depicted in the exemplary embodiment shown in FIG. 1, shroud 102 has a length, extending about longitudinal axis 106, that is greater than the combined length of blade-contacting flange 114 and mechanical fan 116. The lengths of blade-contacting flange 114 and mechanical fan 116 also extend in a direction parallel to the longitudinal axis. The minimum length of shroud 102 is preferably at least the combined length of blade-contacting flange 114 and blades 118. An embodiment, however, may include a shroud not intended to house the mechanical fan when the convertible ducted fan engine is in the fluid-propulsion configuration. Such an embodiment may employ a shroud having a length less than the embodiment shown in FIGS. 1-2. Preferably, the length of the shroud would at least match the length of the mechanical fan.

External surface 120 of shroud 102 includes an aerodynamic taper from fore end 102a to aft end 102b. The tapered shape reduces aerodynamic drag when the convertible ducted fan engine is operating as a fluid-propulsion engine. In an embodiment, the external surface 120 has a non-tapered shape to provide greater traction when the convertible ducted fan engine is operating as a drive-wheel. In an embodiment, external surface 120, includes tread for improving traction when the convertible ducted fan engine is operating as a drive-wheel. In addition, the tread may include longitudinal grooves to improve aerodynamic performance when the convertible ducted fan engine is operating as a fluid-propulsion engine. The tread may include any combination of grooves to improve traction and/or decrease aerodynamic drag.

In an embodiment, external surface 120 of shroud 102 includes one or more bands/ribs of material wrapped around the outer surface of the shroud. For example, external surface 120 may be axially ribbed, which would improve traction and would have a minimal effect on airflow over the external surface of the shroud. Moreover, an embodiment includes a shroud that is easily removable for maintenance or replacement. Detachable collar(s) and corresponding supports allows the mechanical fan to easily exit the shroud for maintenance/replacement.

In an embodiment, screens are added to the fore and/or aft ends of the shroud to reduce the possibility of large objects accumulating in the inner surface of the shroud. This, combined with a controlled process between configurations would minimize possibility of damage to the mechanical fan. This situation is far more critical to the airborne application as the waterborne application would naturally wash material from the internal surface of the shroud after transitioning to water.

Mechanical fan 116 includes a plurality of blades 118 extending outwardly from drive shaft 105. The distal ends of each blade establish an outer diameter of the mechanical fan. As depicted in the exemplary embodiment shown in FIGS. 1-2, the blades are sized so that the outer diameter of the mechanical fan is less than the diameter of internal surface 112 of shroud 102, but greater than the difference between the diameter of internal surface 112 and the distance blade-contacting flange 114 extends inwardly towards longitudinal axis 106. As most clearly shown in FIG. 1B, the size of the outer diameter of mechanical fan 116 allows mechanical fan 116 to freely rotate about longitudinal axis 106 when mechanical fan 116 is disposed proximate to aft end 102b of shroud 102 and out of contact with blade-contacting flange 114. As most clearly shown in FIG. 2B, when mechanical fan 116 is translated to fore end 102a of shroud 102, the size of the outer diameter of mechanical fan 116 enables blades 118 to contact blade-contacting flange 114 causing concurrent rotation of mechanical fan 116 and shroud 102.

It should be noted that the blades are currently depicted in a simple rectangular shape. The blades however, may be angled, such that the width of the proximal end of each blade is angled with respect to the longitudinal axis of the drive shaft. In addition, or alternatively, the blades may include a corkscrew shape extending about the length of each blade.

The exemplary embodiment shown in FIGS. 1-2 includes a hollow drive shaft 105 sized to receive and translate along the length of shroud shaft 104. Moreover, drive shaft 105 is adapted to rotate with respect to shroud shaft 104. Drive shaft 105 and/or shroud shaft 104 may include bearings, or other similar friction reducing objects, materials, and/or fluids, disposed between the two shafts to reduce the friction between the two shafts during both rotation and translation of drive shaft 105 with respect to shroud shaft 104.

The rotation of drive shaft 105 is controlled via a rotational drive motor (not visible) disposed in motor housing 124. The rotational drive motor is adapted to rotate drive shaft 105 in both a clockwise and a counter-clockwise direction. The translation of drive shaft 105 along shroud shaft 104 is controlled via linear drive motor 126. Linear drive motor 126 enables the convertible ducted fan engine to translate between the fluid-propulsion configuration shown in FIG. 1 and the drive-wheel configuration shown in FIG. 2. Regardless of the configuration, linear drive motor 126 remains in communication with shroud shaft 104 to maintain control of the translation of mechanical fan 116.

Figure 3A:
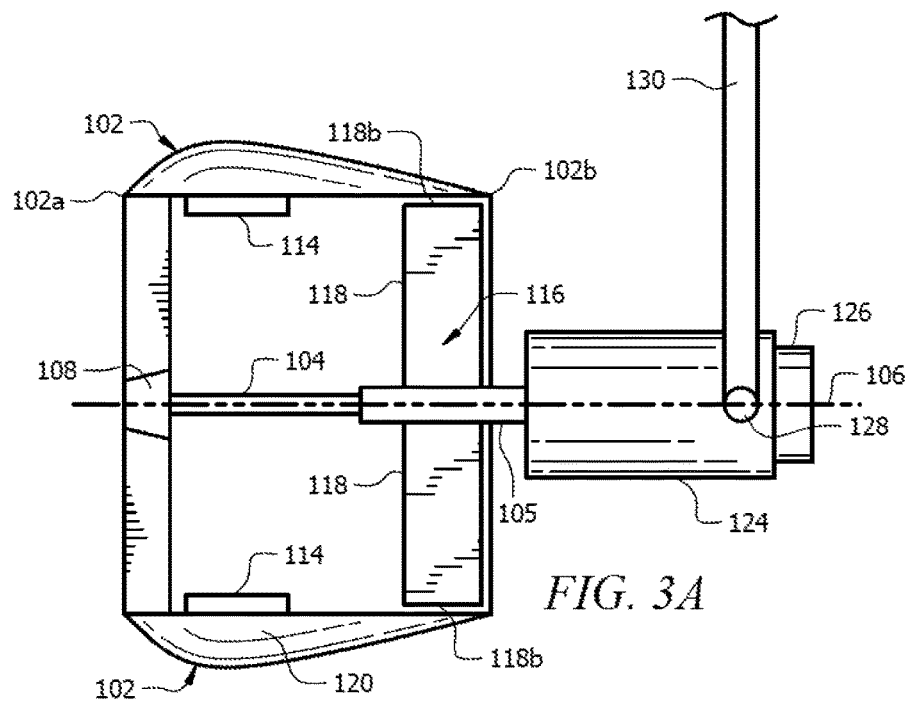
FIG. 3A is a profile view of an embodiment of the convertible ducted fan engine oriented vertically.
Figure 3B:
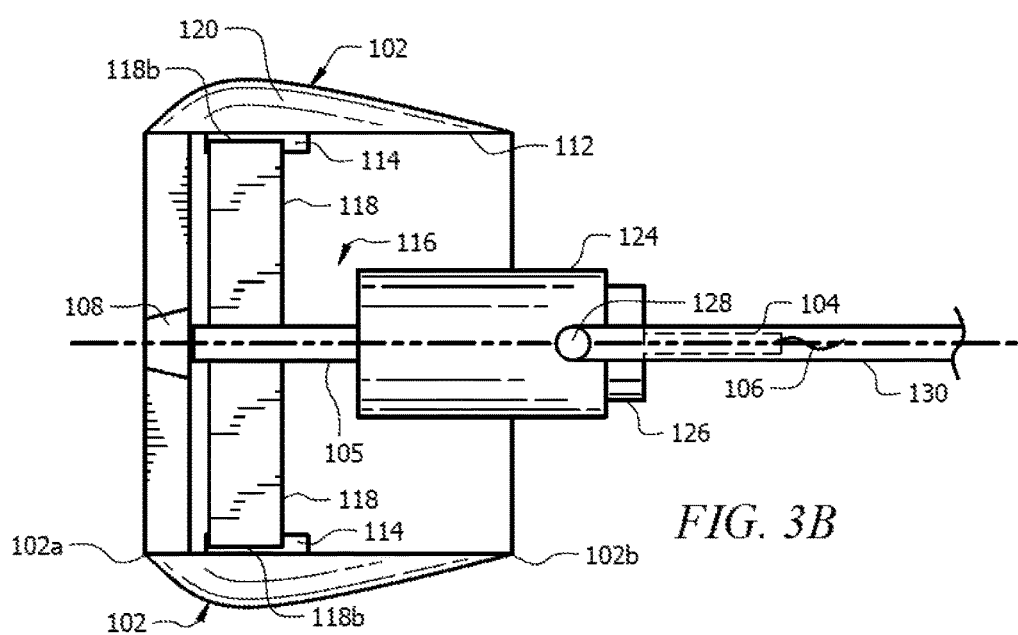
FIG. 3B is a profile view of the embodiment in FIG. 3A pivoted to a horizontal orientation.

Referring now to FIG. 3, an embodiment of the convertible ducted fan engine includes mounting arm 130 pivotally connected to motor housing 124 through pivoting connection 128. Pivoting connection 128 is controlled by a motor and allows the convertible ducted fan engine to easily transition between different orientations. For example, the convertible ducted fan engine may be vertically oriented in the fluid-propulsion configuration as shown in FIG. 3A and can pivoted into a horizontal configuration when the convertible ducted fan engine is converted into the drive-wheel configuration as shown in FIG. 3B. The embodiment provided in FIG. 3 is a simplistic example of how the orientation of the convertible ducted fan engine can be altered. The number, shape, and complexity of mounting arm(s) 130 and pivoting connection(s) 128 is dependent on the vehicle powered by the convertible ducted fan engine(s) and the intended functional ability of that vehicle. A more complex embodiment of the pivoting convertible ducted fan engine may include one or more multidirectional pivoting connections 128 giving the convertible ducted fan engine 360° thrust vectoring and steering capabilities.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A ducted fan engine, comprising:
   a shroud shaft and a drive shaft, wherein the drive shaft is configured to translate in a direction parallel to a longitudinal axis of the shroud shaft;
   a mechanical fan interconnected with the drive shaft, such that movement of the drive shaft in an axial direction causes movement of the mechanical fan in the axial direction, the mechanical fan having a plurality of blades concentrically arranged about a rotational axis, the mechanical fan configured to rotate about the rotational axis;
   a shroud interconnected with the shroud shaft;
   a fluid-propulsion configuration in which the mechanical fan rotates freely with respect to the shroud to produce thrust through fluid flow; and
   a drive-wheel configuration in which at least one of the blades in the plurality of blades is in contact with the shroud, thereby causing concurrent rotation of the shroud and mechanical fan when the mechanical fan rotates about the rotational axis.

2. The ducted fan engine of claim 1, wherein:
   the plurality of blades is concentrically arranged about the drive shaft, such that the drive shaft is axially aligned with the rotational axis; and
   the shroud shaft is aligned with a central longitudinal axis of the shroud.

3. The ducted fan engine of claim 1, further including the drive shaft configured to move the mechanical fan both into contact with the shroud to place the ducted fan engine into the drive-wheel configuration and out of contact with the shroud to place the ducted fan engine into the fluid-propulsion configuration.

4. The ducted fan engine of claim 1, further including a blade-contacting flange disposed on an internal surface of the shroud and extending a distance inwardly towards the central longitudinal axis of the shroud, the distance being greater than the difference between an outer diameter of the mechanical fan and the inner diameter of the shroud.

5. The ducted fan engine of claim 4, wherein the blade-contacting flange is located proximate to a fore end of shroud, such that the drive-wheel configuration is achieved by translating the mechanical fan along the translating drive shaft towards the fore end of the shroud until at least one of the blades in the plurality of blades comes in contact with the blade-contacting flange.

6. The ducted fan engine of claim 4, wherein the fluid-propulsion configuration is achieved by translating the mechanical fan along the translating drive shaft towards an aft end of the shroud until none of the blades in the plurality of blades can contact the blade-contacting flange when the mechanical fan rotates about the rotational axis.

7. The ducted fan engine of claim 1, further including a tread disposed on an outer surface of the shroud, thereby providing traction between a shroud-contacting surface and the shroud when the ducted fan engine operates in the drive-wheel configuration.

8. A ducted fan engine, comprising:
a mechanical fan having a plurality of blades concentrically arranged about a rotational axis, wherein each blade in the plurality of blades has an extent originating from the rotational axis and terminating at a distal free end;
the distal free ends of each blade effectively creating an outer diameter of the mechanical fan;
a shroud having an internal surface establishing an inner diameter, wherein the inner diameter of the shroud is greater in size than the outer diameter of the mechanical fan;
a blade-contacting flange disposed on the internal surface of the shroud and extending a distance inwardly towards the central longitudinal axis of the shroud, the distance being greater than the difference between the outer diameter of the mechanical fan and the inner diameter of the shroud;
a fluid-propulsion configuration in which none of blades in the plurality of blades are in contact with the blade-contacting flange and the mechanical fan is free to rotate about the rotational axis to produce thrust through fluid flow; and
a drive-wheel configuration in which at least one of the blades in the plurality of blades is in contact with the blade-contacting tab, thereby causing concurrent rotation of the shroud and mechanical fan when the mechanical fan rotates about the rotational axis.

9. The ducted fan engine of claim 8, further including a drive shaft, wherein the mechanical fan is configured to translate in an axial direction along the drive shaft, thereby enabling the mechanical fan to change location within the shroud along the longitudinal axis of the shroud.

10. The ducted fan engine of claim 9, wherein the blade-contacting flange is located proximate to a fore end of shroud, such that the drive-wheel configuration is achieved by translating the mechanical fan along the translating drive shaft towards the fore end of the shroud until at least one of the blades in the plurality of blades comes in contact with the blade-contacting flange.

11. The ducted fan engine of claim 9, wherein the fluid-propulsion configuration is achieved by translating the mechanical fan along the translating drive shaft towards an aft end of the shroud until none of the blades in the plurality of blades can contact the blade-contacting flange when the mechanical fan rotates about the rotational axis.

12. The ducted fan engine of claim 8, further including a tread disposed on an outer surface of the shroud, thereby providing traction between a shroud-contacting surface and the shroud when the ducted fan engine operates in the drive-wheel configuration.

13. A ducted fan engine, comprising:
a central shroud shaft and a drive shaft, wherein the drive shaft is configured to telescope with respect to the shroud shaft;
a mechanical fan having a plurality of blades concentrically arranged about the drive shaft, wherein each blade in the plurality of blades has an extent originating from the drive shaft and terminating at a distal free end, the mechanical fan configured to rotate about a rotational axis axially aligned with the drive shaft;
the distal free ends of each blade effectively creating an outer diameter of the mechanical fan;
a cylindrical shroud interconnected with the shroud shaft such that the shroud shaft is aligned with a central longitudinal axis of the cylindrical shroud, the cylindrical shroud further including an internal surface establishing an inner diameter of a size greater than the outer diameter of the mechanical fan;
a blade-contacting flange disposed on the internal surface of the shroud and extending a distance inwardly towards the central longitudinal axis of the shroud, the distance being greater than the difference between the outer diameter of the mechanical fan and the inner diameter of the shroud;
a fluid-propulsion configuration in which none of blades in the plurality of blades are in contact with the blade-contacting flange and the mechanical fan is free to rotate about the rotational axis to produce thrust through fluid flow; and
a drive-wheel configuration in which at least one of the blades in the plurality of blades is in contact with the blade-contacting flange, thereby causing concurrent rotation of the shroud and mechanical fan when the mechanical fan rotates about the rotational axis.

14. The ducted fan engine of claim 13, wherein the mechanical fan is configured to translate in an axial direction along the drive shaft, thereby enabling the mechanical fan to change location within the shroud with respect to the longitudinal axis of the shroud.

15. The ducted fan engine of claim 14, wherein the blade-contacting flange is located proximate to a fore end of shroud, such that the drive-wheel configuration is achieved by translating the mechanical fan along the translating drive shaft towards the fore end of the shroud until at least one of the blades in the plurality of blades comes in contact with the blade-contacting flange.

16. The ducted fan engine of claim 14, wherein the fluid-propulsion configuration is achieved by translating the mechanical fan along the translating drive shaft towards an aft end of the shroud until none of the blades in the plurality of blades can contact the blade-contacting flange when the mechanical fan rotates about the rotational axis.

17. The ducted fan engine of claim 13, further including a tread disposed on an outer surface of the shroud, thereby providing traction between a shroud-contacting surface and the shroud when the ducted fan engine operates in the drive-wheel configuration.

* * * * *